United States Patent Office 2,811,464
Patented Oct. 29, 1957

2,811,464
PROCESS FOR THE PRODUCTION OF ARTIFICIAL LEATHER HAVING SUEDE-LIKE CHARACTER

Karl Stiehl and Karl Reus, Hanau (Main), Germany, assignors to Deutsche Gold- und Silber-Scheideanstalt vormals Roessler, Frankfurt am Main, Germany No Drawing. Application December 12, 1955, Serial No. 552,285

Claims priority, application Germany December 18, 1954

3 Claims. (Cl. 117—11)

The present invention relates to an improved process for the production of artificial leather of suede-like character which can be used as a substitute for all uses to which suede or suede imitations are normally suited. In view of the flexibility and strength of the artificial leather according to the invention, as well as its resistance to ageing, low temperatures and abrasion, it is especially adapted for the production of shoes and wearing apparel of all types, pocketbooks, belts and lining leather.

The suede-like artificial leather according to the invention is produced by applying a coating of an appropriately pigmented polyvinyl chloride paste of about 50 to 150 grams per square meter over a base such as woven or knitted fabrics, paper, fiber fleeces and the like, which has already been provided with a more or less gelled pliable polyvinyl chloride coating of about 100 to 800 grams per square meter, and dusting powdered ammonium carbonate or bicarbonate on the still soft, almost liquid, polyvinyl chloride paste coating with the aid of a suitable dusting apparatus. The thus prepared artificial leather web is then passed through a gelling chamber heated to 140 to 170° C. whereupon the dusted on ammonium compound gasifies with the formation of steam, carbon dioxide and ammonia and a finely pored suede-like surface is produced thereon.

The following example will serve to illustrate a preferred modification according to the invention:

Example

A woven cotton fabric (nettle cloth) of a weight of 140 grams per square meter was coated with a polyvinyl paste produced in the usual way by triturating 45 parts by weight of polyvinyl chloride, 29 parts by weight of dioctylphthalate and 9 parts by weight of iron oxide pigment to provide a coating weighing about 300 grams per square meter. The thus coated fabric was heated for about five minutes to gel the coating. After cooling, the precoated fabric was then coated with a doctor knife with 80 grams per square meter of a polyvinyl chloride paste of the following composition:

45.0% polyvinyl chloride
29.0% dioctylphthalate
5.3% dibutylphthalate
19.9% iron oxide pigment
0.8% lead stearate Directly behind the doctor knife, finely powdered ammonium carbonate was dusted on the polyvinyl chloride paste coating in such a quantity that such paste coating was just completely coated and had a whitish shimmer as a result of the dusted on ammonium carbonate crystals. The thus prepared artificial leather web was then passed through a gelling chamber, heated to about 160° C. and maintained therein about 5 to 10 minutes until the ammonium carbonate was completely gasified. The gelled surface of the artificial leather web after cooling had a finely-pored suede-like surface. Depending upon the particular finish desired, it could be used as such or after light abrading of the surface.

Instead of using ammonium carbonate to dust the polyvinyl chloride paste coating, ammonium bicarbonate or any other suitable substance which is gasified upon heating to 100 to 200° C. to leave no residues which may be injurious to the polyvinyl chloride mass can be employed. Such substances are usually called "blowing agents" and further examples thereof are azo dibutyric acid nitrile (sold under the tradename Porophor), ethyl malonic acid, benzoic acid, o- and m-azoxybenzoic acid, citric acid and the like, as well as per compounds such as benzoyl peroxide and percarbamide.

We claim:

1. A process of producing suede-like artificial leather which comprises applying a thin coating of a pigmented plasticizer containing polyvinyl chloride paste over a pliable gelled polyvinyl chloride coating on a base, dusting a thin coating of a powdered blowing agent which gasifies at a temperature between 100 and 200° C. on the polyvinyl chloride paste coating, and heating the polyvinyl chloride paste coating carrying the dusted on blowing agent to a temperature at which the polyvinyl chloride paste gels and the blowing agent gasifies.

2. The process of claim 1 in which said blowing agent is an ammonium carbonate.

3. The process of claim 1 comprising in addition lightly abrading the gelled polyvinyl paste coating.

References Cited in the file of this patent

UNITED STATES PATENTS

| 1,918,937 | Shelton | July 18, 1933 |
| 2,424,861 | Snow | July 29, 1957 |

FOREIGN PATENTS

| 684,708 | Great Britain | Dec. 24, 1952 |
| 691,833 | Great Britain | May 20, 1953 |